J. McMULLEN.
ANTISKIDDING AND TRACTION APPLIANCE FOR VEHICLE WHEELS.
APPLICATION FILED SEPT. 23, 1913.
1,154,525.
Patented Sept. 21, 1915.
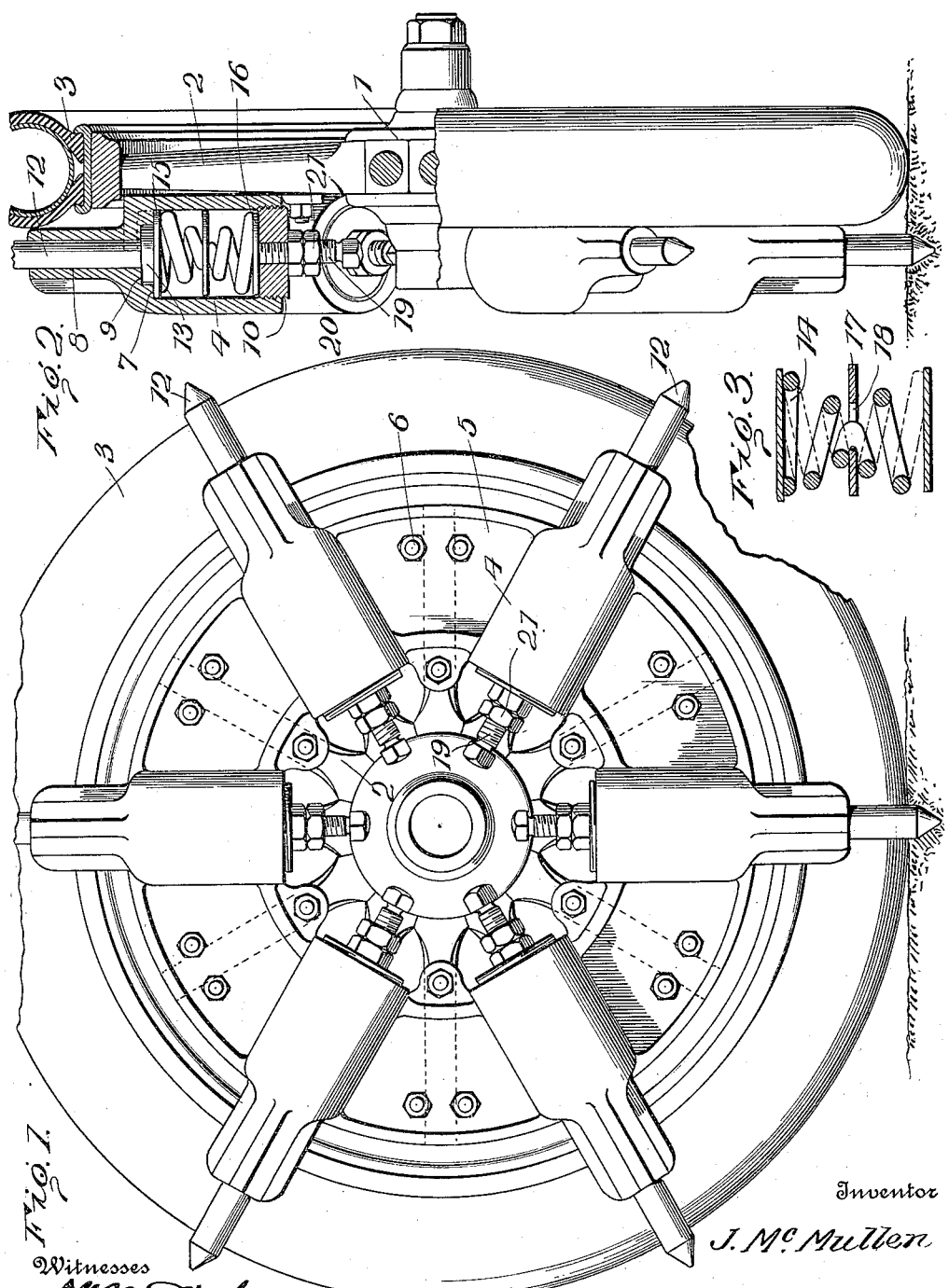

UNITED STATES PATENT OFFICE.

JOHN McMULLEN, OF BUTTE, MONTANA.

ANTISKIDDING AND TRACTION APPLIANCE FOR VEHICLE-WHEELS.

1,154,525.     Specification of Letters Patent.    Patented Sept. 21, 1915.

Application filed September 23, 1913. Serial No. 791,431.

*To all whom it may concern:*

Be it known that I, JOHN McMULLEN, citizen of the United States, residing at Butte, in the county of Silverbow and State of Montana, have invented certain new and useful Improvements in Antiskidding and Traction Appliances for Vehicle-Wheels, of which the following is a specification.

This invention relates to anti-skidding and traction appliances for vehicle wheels and has as its object to provide an appliance of this nature which may be readily embodied in the construction of any ordinary or specially constructed wheel and which will not only increase the tractive force of the wheel by preventing slipping but will also serve effectually to prevent skidding of the wheel.

It is one aim of the invention to provide an appliance of the class stated which will readily adapt itself to the character of the roadway, firmly engaging light or dusty or muddy road surfaces and yet being adapted for passage over concrete or other well finished or compact road surfaces without danger of injury to the same.

Another aim of the invention is to provide a wheel appliance of the class mentioned the use of which will permit of the body of the vehicle being made much lighter than is possible where the ordinary rubber tires or traction rims are employed and incidentally the invention contemplates the provision of an anti-slipping and anti-skidding appliance applicable to the wheels of any motor-propelled vehicle whether of the passenger or freight type or in the nature of a traction engine.

In the accompanying drawings: Figure 1 is a view in side elevation of the device applied to a vehicle wheel. Fig. 2 is a vertical sectional view through a portion of the device. Fig. 3 is a sectional view in detail through one of the cushioning springs and the washers assembled therewith.

In the drawings the wheel is illustrated as of the ordinary construction, including a hub 1, spokes 2, and tire 3.

The appliance embodying the present invention consists essentially of a number of spring-pressed plungers having pointed road surface engaging ends and these plungers are mounted in casings supported upon or forming a part of a spider which is bolted to the spokes of the wheel.

The casings mentioned above are indicated in general each by the reference numeral 4 and the spider includes web portions 5, one of which extends between each two adjacent casings, as clearly shown in Fig. 1 of the drawings. As here illustrated, the casings are integral with the webs 5 of the spider and the webs are secured to the spokes by means of clip bolts 6, although any other suitable fastening means may be employed for this purpose. The body portion of each of the casings, which casings it is to be noted extend radially with respect to the hub of the wheel, is interiorly cylindrical and adjacent its outer end is reduced to form a shoulder 7 and further reduced to form a bore 8 resulting in a shoulder 9. The bore 8 is in axial alinement with the bore of the body portion of the casing and the casing is closed at its inner or major end by means of a threaded plug 10. The plunger which is mounted within the casing is indicated by the numeral 11 and is sharpened at its outer end to a point as indicated at 12. The plunger is slidably fitted in the bore 8 and in order that its outward movement may be limited the plunger is provided at its inner end with a head 13 designed to rest against the shoulder 9. The plungers 11 are yieldably held in projected position or, in other words, in position to engage their pointed ends with the road surface, by means of springs which are arranged within the body portions of the casings 4 as will now be explained.

It is preferable that a spring of double conical form be employed as shown in Figs. 2 and 3 of the drawings, although a spring of some other form or a pair of springs may be used if found desirable. In the drawings this spring is indicated by the numeral 14 and is smaller at its middle than at either end, its whirls increasing in diameter from the middle toward either end of the spring as a whole. The greater diameter of each spring is preferably approximately equal to the interior diameter of the body portion of the casing in which the spring is arranged and at its outer end the spring bears against a washer 15 resting against the shoulder 7 and at its inner end against a washer 16 which may rest against the closure plug 10 or against a tension adjusting screw, as will be presently explained. Fitted on the spring is a guide washer 17 provided centrally with an opening 18 receiving the intermediate portion of the spring. In other words, the washer 17 fits the spring at the apices of the walls of the two conical portions of the spring. It will now be apparent that the spring may be compressed without the interference of one of its whirls with another and that as it is compressed the washer 17 will ride within the casing and support the intermediate portion of the spring whereby to prevent buckling of the same. In order that the tension of each spring may be adjusted there is provided a tension adjusting screw 19 which is adjustably threaded through an opening 20 formed axially in the plug closure 10, this spring bearing at its end against the center of the washer 16. In order that the adjusting screw 19 may be held at adjustment, a set nut 21 is threaded upon it and may be tightened for the purpose stated.

From the foregoing description of the invention it will be apparent that the pointed ends 12 of the plungers project slightly beyond the periphery of the tire 3 and that as they engage in the road surface they may yield to a greater or less degree, depending upon the character of the surface and upon the tension of the springs by which they are normally held projected. For example, if the road surface is light or sandy or if it is muddy the pointed ends of the plungers will enter the same and the tractive force of the wheel will be increased. Such engagement will also prevent skidding as will be readily understood. On the other hand, should the road surface be concrete or of some other highly finished type, it will not be engaged by the plungers for they will be forced back in the casings against the tension of their springs.

It will be understood, of course, that the plungers 11 may be of any desired cross sectional shape as may also the casings 4 and that, as before stated, any other type of spring or more than one spring may be employed if found expedient. It will also be understood that if desired the device instead of being applied to the ordinary wheel may be embodied in the construction of a special type of wheel, in which event the plungers 11 would project through the rim of the wheel instead of beside the tire thereon.

Having described my invention, what I claim is:

1. A device of the class described comprising radially disposed tubular casings having the outer portions of their bores reduced relative to the inner portions of the same, and an intermediate portion between said inner and outer portions, webs extending between the casings and adapted to be secured to the spokes of a wheel, plungers slidably fitted in the outer reduced portions of the bores of the casings and projecting through the outer ends of the same, heads at the inner ends of the plungers adapted to seat within the intermediate portions of the bores of the casings, washers in the inner larger portions of the bores of the casings bearing against said heads, closures for the inner ends of the casings, washers within the casings against said closures, springs housed within the casings and extending between said washers, and tension adjusting devices mounted in the closures and bearing against the respectively adjacent washers.

2. A device of the class described comprising radially disposed tubular casings, webs extending between the casings and adapted to be secured to the spokes of a wheel, plungers slidably mounted in the casings and projecting through the outer ends of the same, and means housed within the casings for yieldably holding the plungers projected.

In testimony whereof I affix my signature in presence of two witnesses.

JOHN McMULLEN. [L. S.]

Witnesses:
PATRICK McCAW,
H. E. TOWNSEND.

Copies of this patent may be obtained for five cents each, by addressing the "Commissioner of Patents, Washington, D. C."